United States Patent [19]

Delaurier

[11] Patent Number: 5,492,182
[45] Date of Patent: Feb. 20, 1996

[54] HARROW

[76] Inventor: Ronald T. Delaurier, Box 85, Laurier, Manitoba, Canada, R0J 1A0

[21] Appl. No.: 215,689

[22] Filed: Mar. 22, 1994

[51] Int. Cl.$^6$ ............................ A01D 77/00; A01B 61/04
[52] U.S. Cl. ............................................ 172/615; 172/622
[58] Field of Search ........................... 172/40, 264, 615, 172/619, 620, 621, 622, 624, 633, 634, 635, 643, 707

[56]  References Cited

U.S. PATENT DOCUMENTS

| | | | |
|---|---|---|---|
| 3,765,159 | 10/1973 | Neff | 172/622 X |
| 3,774,694 | 11/1973 | Gates | 172/643 X |
| 4,003,603 | 1/1977 | Stemler et al. | 172/40 X |
| 4,127,341 | 11/1978 | Stevens | 172/621 X |
| 4,213,506 | 7/1980 | Hake | 172/624 |
| 4,411,321 | 10/1983 | Riach | 172/40 |
| 4,506,898 | 3/1985 | Herron | 172/401 X |
| 4,896,730 | 1/1990 | Jarrett et al. | 172/40 |

*Primary Examiner*—Randolph A. Reese
*Assistant Examiner*—Robert Pezzuto
*Attorney, Agent, or Firm*—Adrian D. Battison; Murray E. Thrift

[57]  ABSTRACT

A harrow comprises an elongate tool bar formed in three sections including a central section and two wing sections all of which can rotate about a longitudinal axis, The wing sections are coupled by pivot couplings which allow the wing sections to fold rearwardly in the transport position. The tool bar carries a number of harrow elements each of which is formed by a rigid frame defined by longitudinal rails and welded cross bars with the frame carrying a plurality of tine support bars. A push rod simultaneously rotates all of the tine support bars about their respective axis to vary the angle of the tine in contact with the ground. The angle of the tines of all of the harrow elements are adjusted simultaneously by a number of rocker shafts mounted on the tool bar and operated by rephasing cylinders. Each push bar of each harrow element is attached to the respective rocker shaft for actuation. The harrow frame is mounted on a bracket passing underneath the square section tool bar and pivots about a horizontal axis just rearward of the tool bar with tension springs forwardly of the tool bar pulling the frame upwardly. The tool bar can be rotated beyond the horizontal position to apply downward pressure on the harrow frame against the ground.

16 Claims, 5 Drawing Sheets

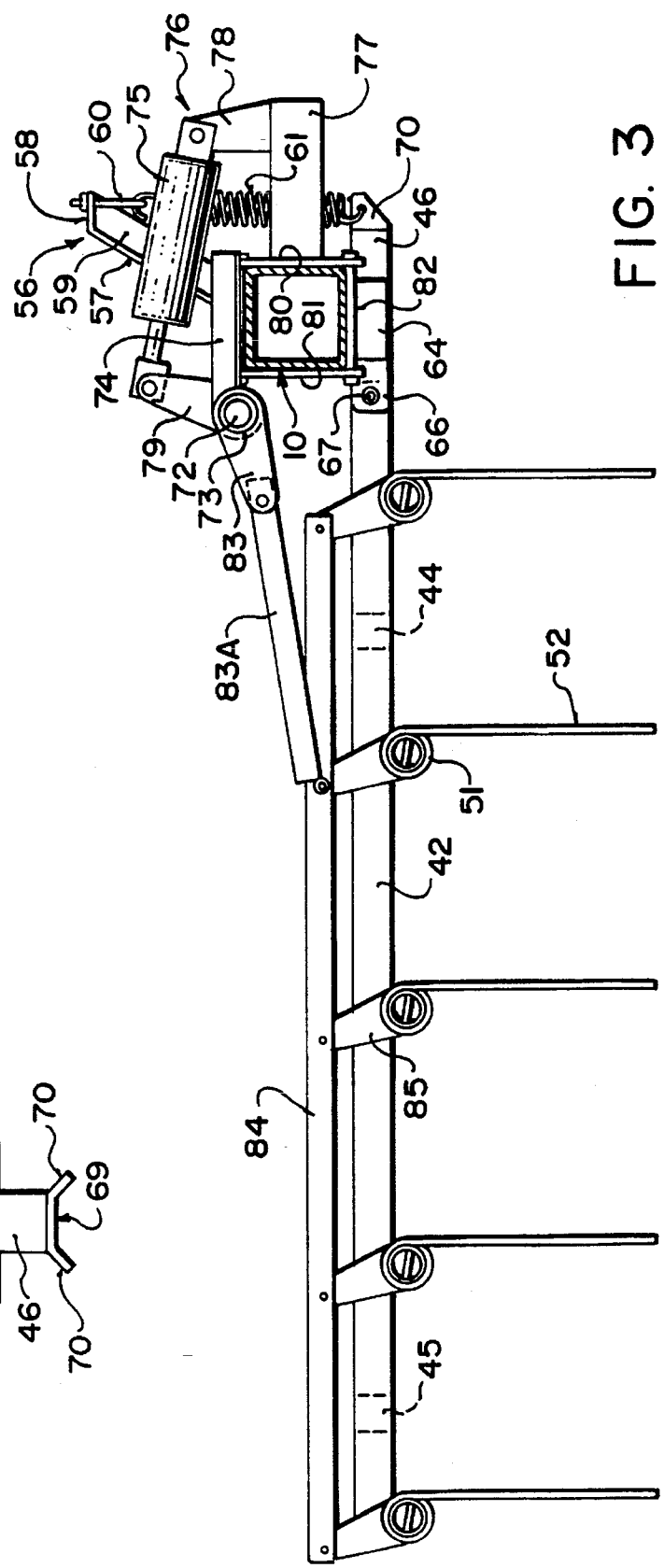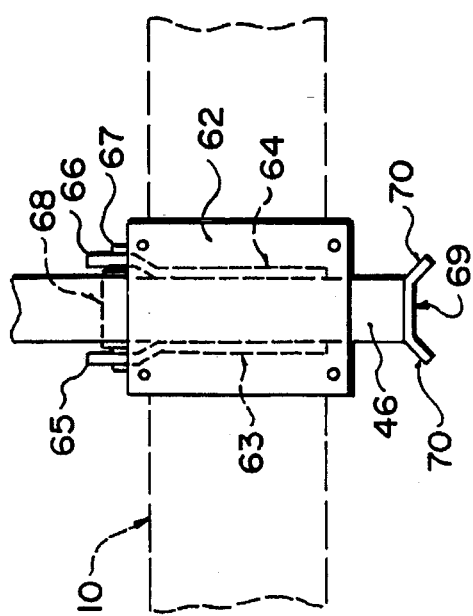

5,492,182

HARROW

BACKGROUND OF THE INVENTION

This invention relates to a harrow of the type comprising an elongate transverse tool bar mounted on ground wheels for transportation across the ground and a plurality of harrow frames suspended from the tool bar and trailing behind the tool bar and including downwardly extending harrow tines for engaging the ground.

The conventional harrow includes the harrow frame having a pair of longitudinally extending rails with transverse tine support bars across the rails and extending outwardly to each side of the rails. The tine support bars carry a plurality of tines each having a coiled upper section wrapped around the tine support bar and a downwardly extending finger section for engaging the ground in a harrowing action.

It is known to modify the harrow action by varying the angle of the tine finger section relative to the axis of the tine support bar so as to vary the inclination of the tine to the vertical in a vertical plane longitudinal of the direction of movement of the tool bar. It is also known to adjust the angle of all of the tines of a frame simultaneously by providing a longitudinally extending actuation bar which carries a plurality of cranks extending from the bar downwardly to the tine support bars so that longitudinal movement of the actuator bar effects rotation of each of the tine support bars about its respective axis.

Various arrangements for supporting the frame from the ground have been provided from simply suspending the frame on chains to various pivot arrangements. In most cases, however the pressure of the harrow frame on the ground is provided solely by the weight of the frame.

In recent years more attention has been given to the action of the harrow on the ground particularly bearing in mind that the harrow may need to operate in increased levels of trash due to low till or no till farming practices.

SUMMARY OF THE INVENTION

It is one object of the present invention to provide an improved harrow in which the various aspects of the action of the harrow tines on the ground is improved to provide a harrowing action which can be varied to accommodate different ground conditions.

According to one aspect of the invention there is provided a harrow comprising an elongate tool bar, ground wheels supporting the tool bar for movement across the ground in a working direction at right angles to the tool bar, a plurality of harrow elements mounted on the tool bar for movement therewith across the ground in a harrowing action, each harrow element comprising a frame, mounting means mounting the frame on the tool bar so as to trail behind the tool bar in a substantially horizontal plane and so as to allow pivotal movement of the frame relative to the tool bar about a horizontal axis parallel to the tool bar, a plurality of parallel tine support bars mounted on the frame transversely to the frame, the tine support bars being spaced apart longitudinally of the frame, each tine support bar having mounted thereon a plurality of harrow tines at spaced positions thereon transversely of the frame, each harrow tine having an upper portion thereof fixed to the respective bar and a lower ground engaging portion extending downwardly from the respective bar for engagement with the ground, each tine support bar being mounted on the frame for rotational movement relative thereto about an axis longitudinal of the tine support bar so as to vary the angle of each tine mounted thereon about the axis of the tine support bar and relative to the ground, each frame having thereon means for common rotational adjustment of the tine support bars thereof each about its respective axis comprising an actuator arm extending generally longitudinal of the frame and a plurality of cranks each extending from the arm to a respective one of the tine support bars such that longitudinal movement of the arm causes simultaneous rotation of the tine support bars each about its respective axis and means for effecting common adjustment of the tines of a plurality of the harrow elements comprising a rocker shaft mounted on the tool bar longitudinally of the tool bar for rotation about a longitudinal axis of the rocker shaft, actuator means for rotating the rocker shaft and a plurality of link arms each extending from the rocker shaft to a respective one of the actuator arms.

According to a second aspect of the invention there is provided a harrow comprising an elongate tool bar, ground wheels supporting the tool bar for movement across the ground in a working direction at right angles to the tool bar, a plurality of harrow elements mounted on the tool bar for movement therewith across the ground in a harrowing action, each harrow element comprising a frame, mounting means mounting the frame on the tool bar so as to trail behind the tool bar in a substantially horizontal plane and so as to allow pivotal movement of the frame relative to the tool bar about a horizontal axis parallel to the tool bar, a plurality of parallel tine support bars mounted on the frame transversely to the frame, the tine support bars being spaced apart longitudinally of the frame, each tine support bar having mounted thereon a plurality of harrow tines at spaced positions thereon transversely of the frame, each harrow tine having an upper portion thereof fixed to the respective bar and a lower ground engaging portion extending downwardly from the respective bar for engagement with the ground, wherein the frame of each harrow element comprises two parallel longitudinal rails and at least two transverse bars spaced longitudinally of the rails interconnecting the rails and welded thereto so as to form the frame into a rigid structure on which the tine support bars are mounted for rotation relative thereto.

According to a third aspect of the invention there is provided a harrow comprising an elongate tool bar, ground wheels supporting the tool bar for movement across the ground in a working direction at right angles to the tool bar, a plurality of harrow elements mounted on the tool bar for movement therewith across the ground in a harrowing action, each harrow element comprising a frame, mounting means mounting the frame on the tool bar so as to trail behind the tool bar in a substantially horizontal plane and so as to allow pivotal movement of the frame relative to the tool bar about a horizontal axis parallel to the tool bar, a plurality of parallel tine support bars mounted on the frame transversely to the frame, the tine support bars being spaced apart longitudinally of the frame, each tine support bar having mounted thereon a plurality of harrow tines at spaced positions thereon transversely of the frame, each harrow tine having an upper portion thereof fixed to the respective bar and a lower ground engaging portion extending downwardly from the respective bar for engagement with the ground, wherein the frame of each harrow element comprises two parallel longitudinal rails and wherein the mounting means of each harrow element comprises a first and a second pivot support assembly each rigidly mounted on the tool bar for engaging and supporting a respective one of the rails of the frame, each pivot support assembly defining a pivot for the respective rail which is fixed relative to the tool bar, each pivot support assembly including spring biasing means extending between the tool bar and the respective rail for biasing the frame relative to the tool bar to rotate about said mounting means into engagement with the ground According to a fourth aspect of the invention there is provided a harrow comprising an elongate tool bar, ground wheels supporting the tool bar for movement across the ground in a working direction at right angles to the tool bar, a plurality of harrow elements mounted on the tool bar for movement therewith across the ground in a harrowing action, each harrow element comprising a frame, mounting means mounting the frame on the tool bar so as to trail behind the tool bar in a substantially horizontal plane and so as to allow pivotal movement of the frame relative to the tool bar about a horizontal axis parallel to the tool bar, a plurality of parallel tine support bars mounted on the frame transversely to the frame, the tine support bars being spaced apart longitudinally of the frame, each tine support bar having mounted thereon a plurality of harrow tines at spaced positions thereon transversely of the frame, each harrow tine having an upper portion thereof fixed to the respective bar and a lower ground engaging portion extending downwardly from the respective bar for engagement with the ground including spring biasing means tending to rotate the frame about said horizontal axis parallel to the tool bar and wherein there is provided means for rotating the tool bar about a longitudinal axis thereof so as to apply downward pressure onto the frame and the harrow tines in a direction to press them onto the ground.

One embodiment of the invention will now be described in conjunction with the accompanying drawings in which:

BRIEF DESCRIPTION OF THE DRAWINGS

FIG. 3 is a cross sectional view along the lines 3—3 of FIG. 2.

FIG. 6 is a cross-sectional view taken along the lines 6—6 of FIG. 1.

In the drawings like characters of reference indicate corresponding parts in the different figures.

DETAILED DESCRIPTION

Figure 4:
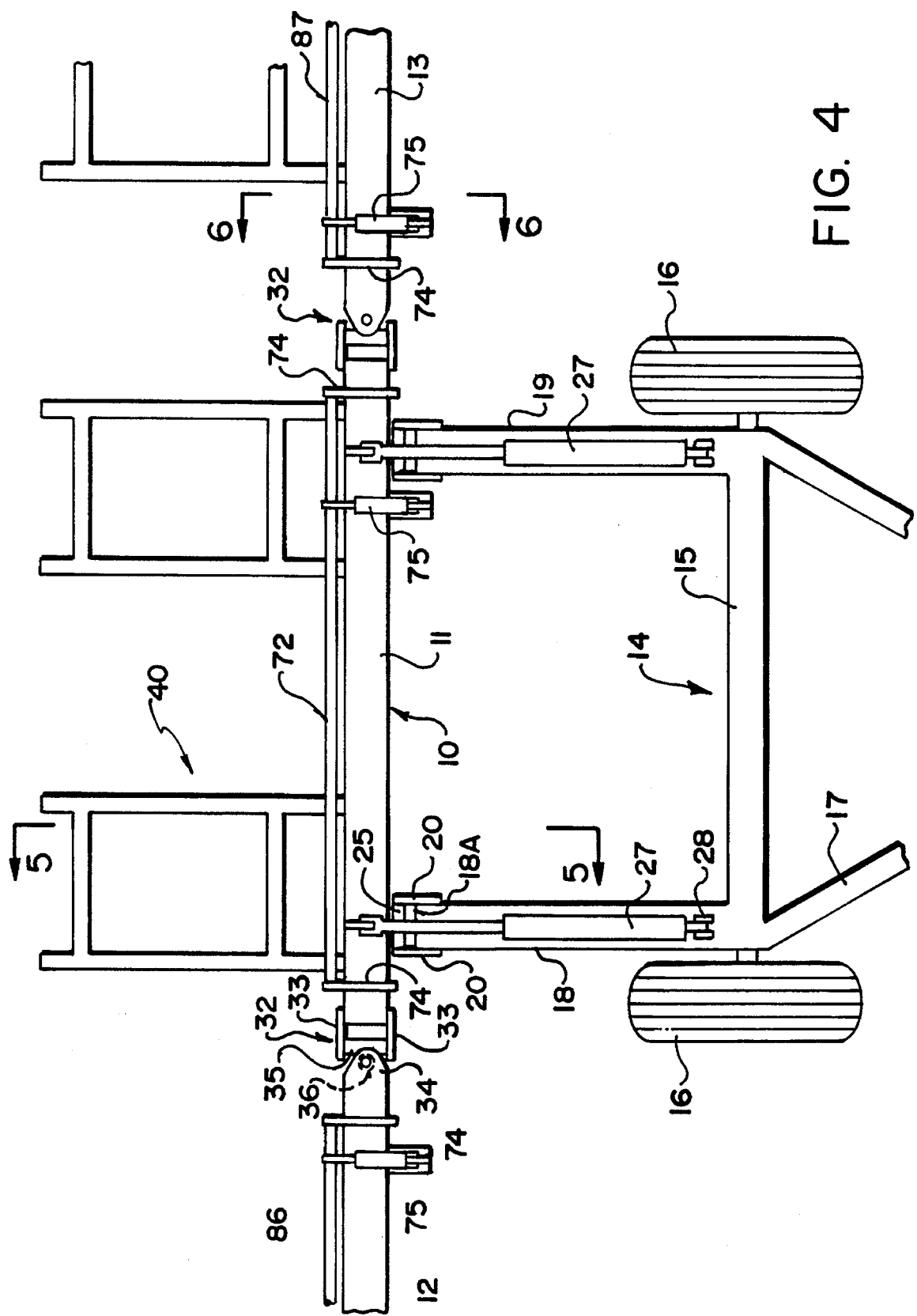
FIG. 4 is a top plan view of a center section of the harrow including a central tool bar portion and the inner ends of two wing tool bar portions.
Figure 5:
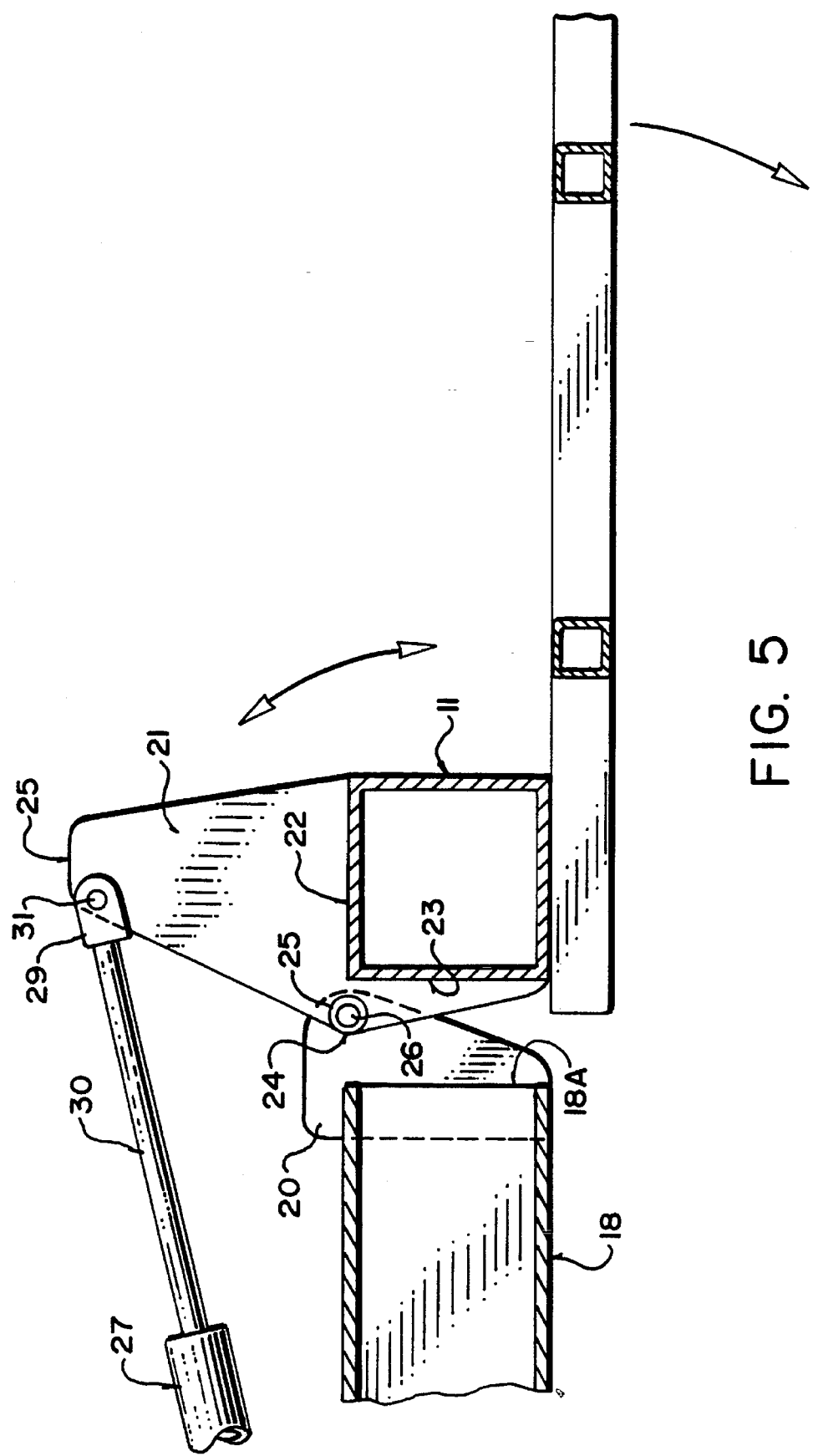
FIG. 5 is a cross sectional view along the lines 5—5 of FIG. 4 of FIG. 1.

The harrow of the present invention comprises a tool bar which is elongate and extends in a direction transverse to the direction of working operation of the harrow in the field. The tool bar is generally indicated at 10 and includes a central tool bar portion 11, see FIG. 4, and two wing tool bar sections 12 and 13 which are connected to the tool bar section 11 and extend outwardly therefrom as effectively a continuation thereof. The central tool bar section 11 is mounted on a central frame support 14 having a main transverse axle 15 carrying a pair of ground wheels 16. The axle 15 is attached to a hitch 17 which extends forwardly to a towing vehicle. The details of the hitch are not shown as these are well known to one skilled in the art. From the axle 15, a pair of rearwardly extending support beams 18 and 19 are arranged at respective ends of the axle 15. The beams 18 and 19 are thus supported in substantially horizontal orientation as shown in FIG. 5. At the rear end of each of the beams 18 and 19 there is provided a pair of support plates 20 which are welded onto sides of the beam and extend rearwardly beyond an end 18A of the beam. On the central tool bar section 11 is mounted a support plate 21 which is welded to a top surface 22 of the square tube forming the tool bar and to a front face 23 of the tube. The plate thus extends upwardly and outwardly from the bottom edge of the front face 23 to a forward most apex 24 and from that apex extends upwardly and rearwardly to a top edge 25 of the plate 21. At the apex 24 is provided a transverse sleeve 25 which extends across the space between the side plates 20 of the beam 18. Through the sleeve 25 is provided a pin 26 which extends also through holes in the plates 20 so as to support the sleeve 25 and thus the central tool bar section on the rear ends of the beams 18 and 19. A hydraulic cylinder 27 is mounted on top of each of the beams 18 and 19 and extends from a support bracket 28 adjacent the axle 15 to a coupling 29 at the end of the piston rod 30 which is attached to a pivot pin 31 at the top of the plate 21. Actuation of the cylinder 27 thus acts to cause the centre tool bar section 11 to rotate about the pin 26 from an operating position as shown in FIG. 5 to a raised position turned through 90° in a counter clockwise direction relative to the operating position shown in FIG. 5. In addition the cylinder 27 is arranged so that the centre tool bar section 11 can be pivoted about the pin 26 in a clockwise direction relative to the position shown in FIG. 5. In the position shown in FIG. 5, it will be appreciated that the bottom surface of the square tube forming the centre tube tool bar section lies in a horizontal plane which is generally the same plane as the bottom surface of the beam 18. However rotation beyond this position tends to turn the tool bar section further in the clockwise direction so that the bottom surface is inclined downwardly and rearwardly.

Each of the winged tool bar sections 12 and 13 is formed by a similar square tube and is connected to the centre tool bar section by a pivot connection 32. Each of the pivot connections is generally of the type conventionally used with harrow bars of this type which includes a pair of side plates 33 mounted on the end of the centre tool bar section and a pair of top plates 34 mounted on the end of the wing tool bar section. Between these plates is provided a pair of pivot couplings defined by a horizontal sleeve 35 and a vertical sleeve 36. A pin passes through each of the sleeves and cooperates with the respective plates 33, 34 in a pivot action. Thus in the working position shown in FIG. 4, the wing tool bar section 12 can pivot upwardly and downwardly about a horizontal axis extending into the working direction defined by the pin passing through the sleeve 35. This allows the wings to move up and down relative to the centre section to accommodate differences in ground level. Each of the wing tool bar sections includes a ground wheel at its outer end (not shown) for supporting the wing tool bar section in movement across the ground.

As is well known, the harrow bar can move to a transport position by rotating the tool bar through 90° as previously described which causes the sleeve 35 to rotate to a vertical position allowing each of the wing tool bar sections to pivot about the vertical axis defined by the sleeve 35 to trail behind the centre section generally at right angles to the centre section. This arrangement is well known to one skilled in the art and therefore will not be described in detail.

Figure 1:
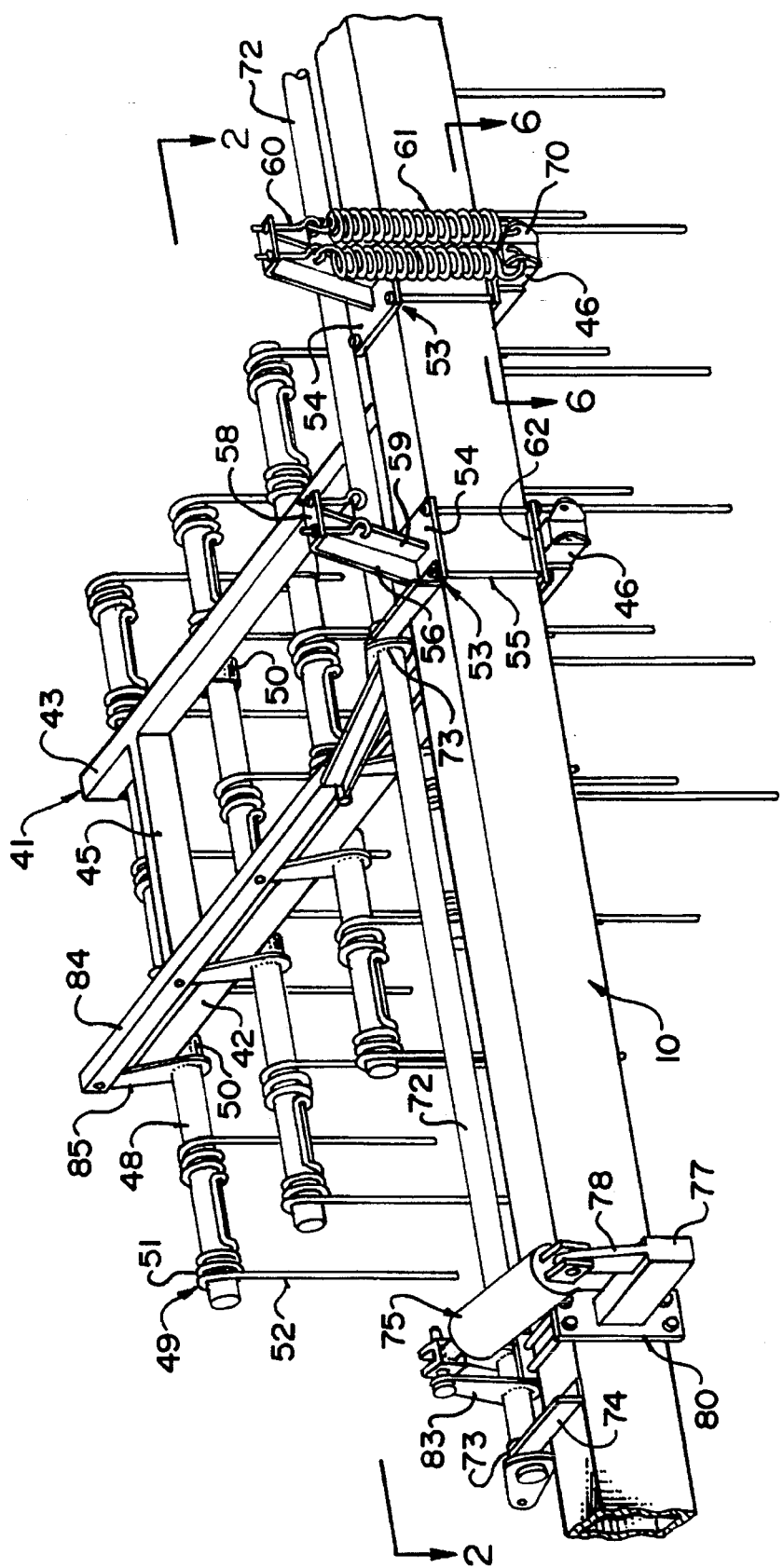
FIG. 1 is an isometric view of one portion of the tool bar of a harrow including a single harrow frame of the harrow.
Figure 2:
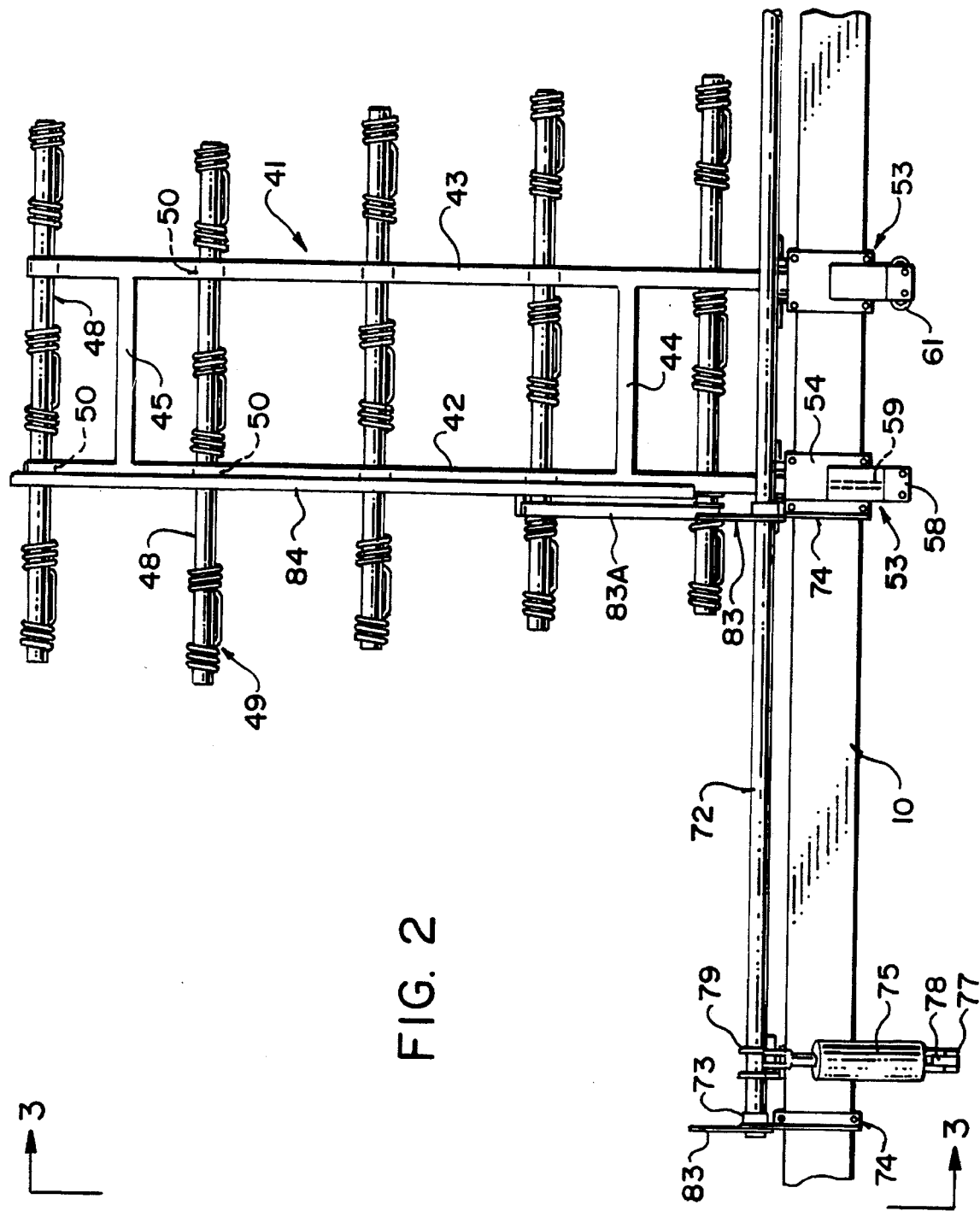
FIG. 2 is a top plan view of the tool bar and single harrow element of FIG. 1, the view being taken along the lines 2—2 of FIG. 1.

The tool bar including the central section and the two wing sections carries a plurality of harrow elements at spaced positions along the length of the tool bar. As shown in FIG. 4, the centre tool bar section carries two harrow elements and the wing sections carry a plurality of such elements depending upon their length. In FIGS. 4 and 5 the harrow elements are shown only schematically with most of the elements omitted for convenience of illustration. In FIGS. 1, 2 and 3, the details of one harrow element are shown and it will of course be appreciated that each of the harrow elements is identical to the others.

Each of the harrow elements therefore comprises a frame 41 including a pair of parallel rails 42 and 43 interconnected by a pair of cross beams 44 and 45. The cross rail 45 is arranged forwardly of the coterminous rear ends of the rails 42 and 43 and the cross beam 44 is arranged rearwardly of the coterminous front ends 46 of the rails. The cross beams 44 and 45 are welded rigidly to the rails 42 and 43 to form a rigid frame structure which is of sufficient strength to prevent twisting of the frame structure in response to forces from the ground and from the support system as described hereinafter.

The harrow element further includes a plurality of tine support bars 48 arranged transversely to the rails 42 and 43 and supported thereby. The tine support bars 48 are carried in collars 50 welded to an underside of each of the rails 42 and 43. Thus each tine support bar includes a pair of such collars with each being welded on a respective one of the rails, the collars supporting the tine support bars underneath the rails and in fixed spacing longitudinally of the rails while allowing rotation of each tine support bar within its respective collars about its longitudinal axis.

Each tine support bar carries the plurality of tines 49 at spaced positions across the width of the tine support bar. Each tine is of a conventional nature including an upper helical coiled section 51 and a downwardly depending finger 52 forming one end of the coil section so the coil section provides a spring action for the tine finger. The coiled sections of two adjacent tines are interconnected by a transverse portion extending along the tine support bar and attached to the tine support bar by a pair of bolts engaged into the tine support bar. In this way the orientation of the coiled section and therefore the finger can be adjusted around the axis of the tine support bar by rotation of the tine support bar within the collars. This rotational movement of course adjusts the angle of the finger 52 relative to the ground. Each of the fingers lies in a vertical plane parallel to the direction of working movement of the harrow and the adjustment movement occurs within this plane so as to move the tines from a vertical position to a rearwardly inclined position and even to a forwardly inclined position if required. As is well known, the angle of the tine to the ground is variable in order to vary the harrowing action to increase aggressiveness on the ground and to accommodate increasing levels of trash on the ground.

The number of tine support bars and the number of tines on those tine support bars can of course vary in accordance with design requirements. It will of course be appreciated however that the tine support bars project outwardly to respective sides of the rails 42 and 43 so that the end most tine of one tine support bar of one harrow element is arranged at a spacing from the adjacent end most tine of the next adjacent harrow element by a spacing approximately equal to the spacing between the harrow tines on the tine support bar itself.

Each of the rails 42 and 43 is mounted on the tool bar 10 by a respective mounting bracket 53. The mounting bracket 53 includes a top plate 54 and a bottom plate 62 each lying in contact with the top and bottom surfaces respectively of the square tube forming the tool bar 10. The plates 54 and 62 are held in place by clamping rods 55 which extend through the plates to a head at one end and to a nut at the opposed end. The top plate 54 carries a spring support tower 56 welded to the upper surface thereof. The tower 56 includes an inclined top plate 57 which extends from a lower end welded to the top plate 54 and extends therefrom upwardly and rearwardly to a horizontal top flange 58. The plate 57 is supported by a vertical web 59 positioned midway across the plates 57 and 58. The plate 58 is located at a position beyond the front face of the tool bar and carries a pair of depending hooks 60 for receiving suspension springs 61.

The bottom plate 62, as best shown in FIG. 6, includes two depending side plates 63 and 64 spaced by the width of the respective rail 42, 43. The side plates extend from the front face to a position beyond the rear face of the tool bar at which point the side plates flare outwardly as indicated at 65, 66 to increase the spacing therebetween. The rail sits between the side plates and is restricted from side to side movement by engagement with the side plates. The rail is carried on the side plates by a transverse shaft 67 which passes through holes in the side plates at the flared section 65, 66 and through a sleeve 68 welded into the rail and extending outwardly to either side of the rail. The increase in spacing between the side plates at the sleeve 68 accommodates the portions of the sleeve projecting outwardly from the sides of the rail.

A shaft 67 thus defines a pivot axis for the rail relative to the bracket and to the tool bar with that axis being positioned just below and just rearwardly of the tool bar.

At the forward end of the rail is provided a bracket 69 including a base plate and two side flanges 70 projecting outwardly and forwardly of the end of the rail. Each flange 70 is attached to a respective one of the springs 61 so that the springs apply a tension pulling the end 46 of the rail upwardly into engagement with the base plate. As the base plate is in contact with the underside of the tool bar, with the tool bar in a horizontal orientation, this locates the frame and the rails 42, 43 in the horizontal orientation extending rearwardly from the tool bar. It will be appreciated, however, that the harrow element can pivot in a counterclockwise about the shaft 67 in response to upward force applied by the ground with that movement being resisted by the tension in the springs 61.

A system for common adjustment of all of the tines of all of the harrow elements comprises a rocker shaft 72 mounted on the tool bar longitudinally of the tool bar at a position adjacent the top rear corner of the tool bar. As shown in FIG. 1, the rocker shaft is mounted in bearings 73 carried on support plates 74 mounted on the top surface of the tool bar and extending rearwardly therefrom. The rocker shaft is actuated in rotational movement about its longitudinal axis by a hydraulic cylinder 75 mounted on a bracket 76. The bracket 76 includes a horizontal portion 77 and an upstanding portion 78 mounted forwardly of the front face of the tool bar to a height just above the tool bar so that the cylinder is carried above the tool bar and actuates movement of the rocker shaft 72 through a crank 79. The horizontal portion of the bracket 76 is mounted on a vertical plate 80 attached to the front face of the tool bar by a rear plate 81 and clamping bolts 82.

The rocker shaft carries, for each harrow element, an actuator crank 83 which operates through a link 83A a longitudinal push bar 84 lying alongside and parallel to one of the rails 42. The push bar 84 includes a plurality of cranks 85 each of which extends from the push bar to a respective one of the tine support bars so that longitudinal movement of the push bar causes common rotational movement of each of the cranks 85 with the tine support bar attached thereto about a respective axis of the tine support bar within the support collar 50.

Actuation therefore of the cylinder 75 effects common movement of all of the harrow elements of the tool bar section. As shown in FIG. 4, each of the tool bar sections includes a separate rocker shaft indicated at 72 for the centre section, 86 for the left hand section and 87 for the right hand section. Each of these rocker shafts is mounted in bearings on support arms 74 and each is actuated by a separate cylinder 75 of the type previously described. The cylinders are arranged as rephasing cylinders so that they operate simultaneously to exact the same degree of movement in response to the supply of pressurized fluid. Such rephasing cylinders are well known and provide common simultaneous movement through a predetermined amount as required.

The harrow element is in its normal operating position in the horizontal orientation shown in FIG. 3 as set by the horizontal orientation of the bottom surface of the tool bar. As explained previously, however, it is possible for the angle of the tool bar to be adjusted by rotation in the clockwise direction as shown in FIG. 5 which turns the harrow element in the same direction and increases the pressure of the harrow element at the rear end of the harrow element against the ground. Upon resistance from the ground, the rotational movement of the harrow element is resisted and this causes pivoting action of the harrow element as previously described about the shaft 67 against the bias of the spring 61. The spring 61 therefore have a spring tension arranged to provide a required level of force of the harrow element in contact with the ground. The operator of the harrow can thus from the cab adjust the angle of the tool bar to vary the harrowing action by operation of the cylinders 27. In addition the operator can vary the angle of the tines as previously described by operating the cylinders 75. The rigid structure of the frame of the harrow element ensures that all of the tines of the harrow element are maintained in pressure against the ground and there is no twisting of the frame which will allow some of the harrow elements to lift and lose their action. The arrangement of the pivotal support of the frame on the tool bar and the spring tension which applies biasing force tending to hold the frame in the horizontal position but allowing it to rotate upon rotation of the tool bar also provides an effective control over the harrowing action.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A harrow comprising: an elongate tool bar;
   ground wheels supporting the tool bar for movement across the ground in a working direction at right angles to the tool bar;
   a plurality of separate harrow elements for mounting on the tool bar at a plurality of spaced positions thereon alone the length thereof for movement therewith across the ground in a harrowing action;
   each harrow element comprising a frame, mounting means for mounting the frame on the tool bar so as to trail behind the tool bar in a substantially horizontal plane and so as to allow pivotal movement of the frame relative to the tool bar about a horizontal axis parallel to the tool bar, a plurality of parallel tine support bars mounted on the frame transversely to the frame, the tine support bars being spaced apart longitudinally of the frame, each tine support bar having mounted thereon a plurality of harrow tines at spaced positions thereon transversely of the frame, each harrow tine having an upper portion thereof fixed to the respective bar and a lower ground engaging portion extending downwardly from the respective bar for engagement with the ground, each tine support bar being mounted on the frame for rotational movement relative thereto about an axis longitudinal of the tine support bar so as to vary the angle of each tine mounted thereon about the axis of the tine support bar and relative to the ground;
   each frame having thereon means for common rotational adjustment of the tine support bars thereof each about its respective axis comprising an actuator arm extending generally longitudinal of the frame and a plurality of cranks each extending from the arm to a respective one of the tine support bars such that longitudinal movement of the arm causes simultaneous rotation of the tine support bars each about its respective axis;
   and means for effecting common adjustment of the tines of a plurality of the harrow elements comprising a rocker shaft extending longitudinally of the tool bar to each of said plurality of spaced positions thereon, means mounting the rocker shaft on the tool bar for rotation about a longitudinal axis of the rocker shaft, actuator means for rotating the rocker shaft and a plurality of separate link arms each mounted on said rocker shaft at a respective one of said positions and extending from said rocker shaft to the actuator arm of a respective one of the harrow elements.

2. The harrow according to claim 1 wherein the tool bar includes a plurality of tool bar sections, each tool bar section having a plurality of harrow elements mounted thereon, each tool bar section having a respective one of a plurality of rocker shafts mounted thereon each for actuating the harrow elements of the respective tool bar section and each tool bar section including actuator means for simultaneous rotation of the plurality of rocker shafts.

3. The harrow according to claim 2 wherein the actuator means for each tool bar section comprises a rephasing hydraulic cylinder.

4. A harrow comprising:
   an elongate tool bar;
   ground wheels supporting the tool bar for movement across the ground in a working direction at right angles to the tool bar;
   a plurality of separate harrow elements for mounting on the tool bar at a plurality of spaced positions thereon along the length thereof for movement therewith across the ground in a harrowing action;
   each harrow element comprising a frame having two parallel longitudinal rails and at least two transverse bars spaced longitudinally of the rails interconnecting the rails and welded thereto so as to form the frame into a rigid structure, a plurality of parallel tine support bars mounted on the longitudinal rails transversely to the longitudinal rails, the tine support bars being spaced apart longitudinally of the longitudinal rails, each tine support bar having mounted thereon a plurality of harrow tines at spaced positions thereon transversely of the frame, each harrow tine having an upper portion thereof fixed to the respective bar and a lower ground engaging portion extending downwardly from the respective bar for engagement with the ground, each tine support bar being mounted on the longitudinal rails for rotational movement relative thereto about an axis longitudinal of the tine support bar so as to vary the angle of each tine mounted thereon about the axis of the tine support bar and relative to the ground;

mounting means for mounting each frame on the tool bar so as to trail behind the tool bar in a substantially horizontal plane and so as to allow pivotal movement of the frame relative to the tool bar about a horizontal axis parallel to the tool bar, the mounting means of each harrow element comprising a first and a second pivot support assembly each rigidly mounted on the tool bar for engaging and supporting a respective one of the rails of the frame, each pivot support assembly defining a pivot axis for the respective rail which is fixed relative to the tool bar;

spring biasing means extending between the tool bar and each respective frame for biasing the frame relative to the tool bar to rotate about said mounting means into engagement with the ground;

each frame having thereon means for common rotational adjustment of the tine support bars thereof each about its respective axis comprising an actuator arm extending generally longitudinal of the longitudinal rails and a plurality of cranks each extending from the arm to a respective one of the tine support bars such that longitudinal movement of the arm causes simultaneous rotation of the tine support bars each about its respective axis;

and means for effecting common adjustment of the tines of a plurality of the harrow elements comprising a rocker shaft extending longitudinally of the tool bar to each of said plurality of spaced positions thereon, means mounting the rocker shaft on the tool bar for rotation about a longitudinal axis of the rocker shaft, actuator means for rotating the rocker shaft and a plurality of separate link arms each mounted on said rocker shaft at a respective one of said positions and extending from said rocker shaft to the actuator arm of a respective one of the harrow elements.

5. The harrow according to claim 4 wherein the spring biasing means for each frame comprises two separate spring elements each extending from the tool bar to a respective one of the longitudinal rails.

6. The harrow according to claim 5 wherein the pivot for each rail is arranged rearwardly of a rear face of a tool bar and wherein the rail extends forwardly therefrom underneath the tool bar to a forward end of the rail forwardly of a forward face of the tool bar and wherein the spring element is connected to the forward end of the rail and extends upwardly therefrom to a spring mount rigidly connected to the tool bar.

7. The harrow according to claim 6 wherein there is provided a pair of lugs each extending outwardly from a respective side of the rail and wherein the spring element comprises a pair of tension springs each having its lower end connected to a respective one of the lugs.

8. The harrow according to claim 6 wherein each pivot support assembly comprises a horizontal plate mounted on an underside of the tool bar and a pair of parallel side plates extending downwardly therefrom and longitudinally of the respective rail, the spacing between the side plates being arranged so as to just receive the rail therebetween and a pivot shaft extending through the rail and through the side plates at right angles to the rail so as to allow pivotal movement of the rail relative to the side plates about the shaft.

9. The harrow according to claim 8 wherein the rail includes a sleeve welded therein surrounding the shaft, ends of the sleeve projecting outwardly from side faces of the rail, the side plates being shaped so as to increase in spacing at the sleeve to accommodate the sleeve therebetween.

10. The harrow according to claim 4 wherein the tool bar includes a plurality of tool bar sections, each tool bar section having a plurality of harrow elements mounted thereon, each tool bar section having a respective one of a plurality of rocker shafts mounted thereon each for actuating the harrow elements of the respective tool bar section and each tool bar section including actuator means for simultaneous rotation of the plurality of rocker shafts.

11. The harrow according to claim 10 wherein the actuator means for each tool bar section comprises a rephasing hydraulic cylinder.

12. A harrow comprising:

an elongate tool bar;

ground wheels supporting the tool bar for movement across the ground in a working direction at right angles to the tool bar;

a plurality of separate harrow elements for mounting on the tool bar at a plurality of spaced positions thereon along the length thereof for movement therewith across the ground in a harrowing action;

each harrow element comprising a frame having two parallel longitudinal rails and at least two transverse bars spaced longitudinally of the rails interconnecting the rails and welded thereto so as to form the frame into a rigid structure, a plurality of parallel line support bars mounted on the longitudinal rails transversely to the longitudinal rails, the tine support bars being spaced apart longitudinally of the longitudinal rails, each tine support bar having mounted thereon a plurality of harrow tines at spaced positions thereon transversely of the frame, each harrow tine having an upper portion thereof fixed to the respective bar and a lower ground engaging portion extending downwardly from the respective bar for engagement with the ground;

mounting means for mounting each frame on the tool bar so as to trail behind the tool bar in a substantially horizontal plane and so as to allow pivotal movement of the frame relative to the tool bar about a horizontal axis parallel to the tool bar, the mounting means of each harrow element comprising a first and a second pivot support assembly each rigidly mounted on the tool bar for engaging and supporting a respective one of the rails of the frame, each pivot support assembly defining a pivot axis for the respective rail which is fixed relative to the tool bar;

and spring biasing means extending between the tool bar and each respective frame for biasing the frame relative to the tool bar to rotate about said mounting means into engagement with the ground;

wherein the spring biasing means for each frame comprises two separate spring elements each extending from the tool bar to a respective one of the rails.

13. A harrow comprising:

an elongate tool bar;

ground wheels supporting the tool bar for movement across the ground in a working direction at right angles to the tool bar;

a plurality of separate harrow elements for mounting on the tool bar at a plurality of spaced positions thereon along the length thereof for movement therewith across the ground in a harrowing action;

each harrow element comprising a frame having two parallel longitudinal rails and at least two transverse bars spaced longitudinally of the rails interconnecting the rails and welded thereto so as to form the frame into a rigid structure, a plurality of parallel tine support bars mounted on the longitudinal rails transversely to the longitudinal rails, the tine support bars being spaced apart longitudinally of the longitudinal rails, each line support bar having mounted thereon a plurality of harrow tines at spaced positions thereon transversely of the frame, each harrow tine having an upper portion thereof fixed to the respective bar and a lower ground engaging portion extending downwardly from the respective bar for engagement with the ground;

mounting means for mounting each frame on the tool bar so as to trail behind the tool bar in a substantially horizontal plane and so as to allow pivotal movement of the frame relative to the tool bar about a horizontal axis parallel to the tool bar, the mounting means of each harrow element comprising a first and a second pivot support assembly each rigidly mounted on the tool bar for engaging and supporting a respective one of the rails of the frame, each pivot support assembly defining a pivot axis for the respective rail which is fixed relative to the tool bar;

and spring biasing means extending between the tool bar and each respective frame for biasing the frame relative to the tool bar to rotate about said mounting means into engagement with the ground;

wherein the spring biasing means for each frame comprises two separate spring elements each extending from the tool bar to a respective one of the rails;

wherein the pivot for each rail is arranged rearwardly of a rear face of a tool bar with the rail extending forwardly therefrom underneath the tool bar to a forward end of the rail forwardly of a forward face of the tool bar;

and wherein the respective spring element is connected to the forward end of the rail and extends upwardly therefrom to a spring mount rigidly connected to the tool bar.

14. The harrow according to claim 13 wherein each pivot support assembly comprises a horizontal plate mounted on an underside of the tool bar and a pair of parallel side plates extending downwardly therefrom and longitudinally of the respective rail, the spacing between the side plates being arranged so as to just receive the rail therebetween and a pivot shaft extending through the rail and through the side plates at right angles to the rail so as to allow pivotal movement of the rail relative to the side plates about the shaft.

15. The harrow according to claim 14 wherein the rail includes a sleeve welded therein surrounding the shaft, ends of the sleeve projecting outwardly from side faces of the rail, the side plates being shaped so as to increase in spacing at the sleeve to accommodate the sleeve therebetween.

16. The harrow according to claim 15 wherein there is provided a pair of lugs each extending outwardly from a respective side of the rail and wherein the spring element comprises a pair of tension springs each having its lower end connected to a respective one of the lugs.

* * * * *